US011826860B2

(12) United States Patent
Kawasaki et al.

(10) Patent No.: US 11,826,860 B2
(45) Date of Patent: Nov. 28, 2023

(54) FLUX AND SOLDER PASTE

(71) Applicant: SENJU METAL INDUSTRY CO., LTD., Tokyo (JP)

(72) Inventors: Hiroyoshi Kawasaki, Tokyo (JP); Masato Shiratori, Tokyo (JP); Kazuhiro Minegishi, Tokyo (JP); Yuji Kawamata, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/799,967

(22) PCT Filed: Feb. 17, 2021

(86) PCT No.: PCT/JP2021/005980
§ 371 (c)(1),
(2) Date: Aug. 16, 2022

(87) PCT Pub. No.: WO2021/166972
PCT Pub. Date: Aug. 26, 2021

(65) Prior Publication Data
US 2023/0113712 A1  Apr. 13, 2023

(30) Foreign Application Priority Data
Feb. 18, 2020 (JP) .................. 2020-025679

(51) Int. Cl.
*B23K 35/36* (2006.01)
*B23K 35/362* (2006.01)
*B23K 35/02* (2006.01)

(52) U.S. Cl.
CPC ...... *B23K 35/3618* (2013.01); *B23K 35/0244* (2013.01); *B23K 35/362* (2013.01)

(58) Field of Classification Search
CPC .................................. B23K 35/3618
See application file for complete search history.

(56) References Cited

U.S. PATENT DOCUMENTS

| | | | | |
|---|---|---|---|---|
| 2004/0069376 A1* | 4/2004 | Saikawa | ............ | B23K 35/3618 148/23 |
| 2019/0015937 A1 | 1/2019 | Nakaji et al. | | |

FOREIGN PATENT DOCUMENTS

| | | |
|---|---|---|
| CN | 1471450 | 1/2004 |
| CN | 1671506 | 9/2005 |
| CN | 101073862 | 11/2007 |
| CN | 101564805 | 10/2009 |
| CN | 105451929 | 3/2016 |
| CN | 108500511 | 9/2018 |
| CN | 108581276 | 9/2018 |
| EP | 3 050 930 | 8/2016 |
| JP | 2013-082004 | 5/2013 |
| JP | 2019-018210 | 2/2019 |
| JP | 2019-081200 | 5/2019 |
| JP | 6643744 | 2/2020 |
| TW | 201612198 | 4/2016 |
| WO | WO-02/38328 | 5/2002 |

OTHER PUBLICATIONS

Notice of Reasons for Refusal for Application No. 2020-025679, dated Jun. 21, 2020 (7 pages).
International Search Report for Application No. PCT/JP2021/005980, dated May 11, 2021 (4 pages).
Chinese Office Action for Application No. 202180014698.0, dated Jan. 6, 2023 (9 pages).
Taiwanese Notice of Allowance for Application. No. 110105307, dated Jul. 10, 2023 (5 pages).
Extended European Search Report for App. No. 21757935.8, dated Jul. 18, 2023 (7 pages).

* cited by examiner

*Primary Examiner* — Anthony M Liang
(74) *Attorney, Agent, or Firm* — NIXON PEABODY LLP; Jeffrey L. Costellia

(57) ABSTRACT

A flux containing an organic acid, a water-soluble base agent, and a solvent, but not containing water is adopted. In this flux, the organic acid includes 1,2,3-propanetricarboxylic acid. The water-soluble base agent is one or more selected from the group consisting of a nonionic surfactant and a weak cationic surfactant. The content of the 1,2,3-propanetricarboxylic acid is 1% by mass or more and 15% by mass or less with respect to the total amount of the entire flux, the total content of the water-soluble base agent is 30% by mass or more and 65% by mass or less with respect to the total amount of the entire flux, and the total content of the solvent is 30% by mass or more and 65% by mass or less with respect to the total amount of the entire flux. According to this flux, the wettability of solder can be enhanced and ball missing after reflow and flux residue washing is suppressed.

5 Claims, No Drawings

FLUX AND SOLDER PASTE

TECHNICAL FIELD

The present invention relates to a flux and a solder paste.

Priority is claimed on Japanese Patent Application No. 2020-025679, filed in Japan on Feb. 18, 2020, the content of which is incorporated herein by reference.

BACKGROUND ART

Generally, fluxes used for soldering have efficacy of chemically removing a metal oxide present between a solder and the metallic surface of an object to be joined, which is an object of soldering, and of enabling the movement of a metal element in the boundary between the solder and the object. Therefore, soldering using the flux allows the formation of an intermetallic compound between the solder and the metallic surface of the object to be joined, and strong joining can be obtained.

Conventionally, as fluxes having wettability, there has been a demand for a water-soluble flux capable of easily washing a residue with water in order to enhance the reliability of joining between solder and an object to be joined.

In response to such a demand, a water-soluble flux containing a water-soluble binder, an activator selected from the group consisting of a sulfonic acid compound, a sulfuric acid compound, a sulfamic acid compound, a polyvalent carboxylic acid compound and a persulfuric acid compound, and water has been proposed (refer to Patent Document 1).

CITATION LIST

Patent Document

Patent Document 1

PCT International Publication No. WO 2002/038328

SUMMARY OF INVENTION

Technical Problem

However, when a solder ball to which the water-soluble flux described in Patent Document 1 has been transferred is mounted on a joint, then, reflow is performed, and subsequently, a flux residue is washed, there is a problem in that the solder ball deviates from the joint (ball missing is likely to occur).

Therefore, an object of the present invention is to provide a flux with which the wettability of solder can be enhanced and ball missing after reflow and flux residue washing is suppressed.

Solution to Problem

In order to solve the above-described problem, the present invention adopted the following configurations.

That is, a first aspect of the present invention is a flux containing an organic acid, a water-soluble base agent, and a solvent, in which the flux does not contain water, the organic acid includes 1,2,3-propanetricarboxylic acid, and a content of the 1,2,3-propanetricarboxylic acid is more than 0% by mass and 15% by mass or less with respect to a total amount of an entire flux.

In the flux according to the first aspect, the water-soluble base agent preferably includes one or more selected from the group consisting of a nonionic surfactant and a weak cationic surfactant.

In addition, in the flux according to the first aspect, a content of the water-soluble base agent is preferably 30% by mass or more and 65% by mass or less with respect to the total amount of the entire flux.

In addition, the flux according to the first aspect may be a flux containing an organic acid, a water-soluble base agent, and a solvent, but not containing water, in which the organic acid includes 1,2,3-propanetricarboxylic acid, the water-soluble base agent is one or more selected from the group consisting of a nonionic surfactant and a weak cationic surfactant, the nonionic surfactant is one or more selected from the group consisting of a polyethylene glycol, an ethylene oxide-resorcin copolymer, polyoxyalkylene acetylene glycols, polyoxyalkylene glyceryl ether, polyoxyalkylene alkyl ether, polyoxyalkylene ester, polyoxyalkylene alkyl amine, polyoxyalkylene alkylamide, an aliphatic alcohol polyoxyethylene adduct, an aromatic alcohol polyoxyethylene adduct, and a polyvalent alcohol polyoxyethylene adduct, the weak cationic surfactant is one or more selected from the group consisting of terminal diamine polyethylene glycol, a terminal diamine polyethylene glycol-polypropylene glycol copolymer, an aliphatic amine polyoxyethylene adduct, an aromatic amine polyoxyethylene adduct, and a polyvalent amine polyoxyethylene adduct, a content of the 1,2,3-propanetricarboxylic acid is 1% by mass or more and 15% by mass or less with respect to a total amount of the entire flux, a total content of the water-soluble base agent is 30% by mass or more and 65% by mass or less with respect to the total amount of the entire flux, and a total content of the solvent is 30% by mass or more and 65% by mass or less with respect to the total amount of the entire flux.

In addition, it is preferable that the flux according to the first aspect further contains an organic acid other than the 1,2,3-propanetricarboxylic acid, and a content of the organic acid other than the 1,2,3-propanetricarboxylic acid is more than 0% by mass and 10% by mass or less with respect to the total amount of the entire flux.

In addition, it is preferable that the flux according to the first aspect further contains an amine, and a content of the amine is more than 0% by mass and 10% by mass or less with respect to the total amount of the entire flux.

In addition, it is preferable that the flux according to the first aspect further contains a rosin, and a content of the rosin is more than 0% by mass and less than 5% by mass with respect to the total amount of the entire flux.

In addition, a second aspect of the present invention is a solder paste containing the flux according to the first aspect and a solder powder.

Advantageous Effects of Invention

According to the present invention, it is possible to provide a flux with which the wettability of solder can be enhanced and ball missing after reflow and flux residue washing is suppressed.

DESCRIPTION OF EMBODIMENTS

<Flux>

A flux of the present embodiment contains an organic acid, a water-soluble base agent, and a solvent, but does not contain water.

The organic acid includes 1,2,3-propanetricarboxylic acid. The content of the 1,2,3-propanetricarboxylic acid is preferably more than 0% by mass and 20% by mass or less, more preferably more than 0% by mass and 15% by mass or less, and still more preferably 1% by mass or more and 15% by mass or less with respect to the total amount of the entire flux.

Since the flux of the present embodiment is highly water-soluble, it is easy to remove the residue of the flux of the present embodiment by water washing.

(Organic Acid)

The flux of the present embodiment contains 1,2,3-propanetricarboxylic acid, which makes it possible to make the flux have sufficient solder wettability (wetting speed).

The flux of the present embodiment may further contain an organic acid other than the 1,2,3-propanetricarboxylic acid (other organic acid).

Examples of the other organic acids include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, linolenic acid, a dimer acid, a trimer acid, a hydrogenated dimer acid, which is a hydrogenated substance obtained by adding hydrogen to a dimer acid, a hydrogenated trimer acid, which is a hydrogenated substance obtained by adding hydrogen to a trimer acid, and the like.

One organic acid may be used singly or two or more organic acids may be mixed and used.

The other organic acid is preferably one or more selected from the group consisting of adipic acid, 2,2-bis(hydroxymethyl)propionic acid, and succinic acid.

In a case where the flux of the present embodiment contains the other organic acid, the content of the other organic acid is preferably more than 0% by mass and 15% by mass or less and more preferably more than 0% by mass and 10% by mass or less with respect to the total amount of the entire flux.

The content of the 1,2,3-propanetricarboxylic acid is preferably 5% by mass or more and more preferably 9% by mass or more with respect to the total content of the organic acid.

(Water-Soluble Base Agent)

The flux of the present embodiment contains the water-soluble base agent, which makes it possible to make the flux have a sufficient ball missing suppression capability.

Examples of the water-soluble base agent that is contained in the flux of the present embodiment include nonionic surfactants, weak cationic surfactants, and the like.

Examples of the nonionic surfactants include polyethylene glycols, ethylene oxide-resorcin copolymers, polyoxyalkylene acetylene glycols, polyoxyalkylene glyceryl ether, polyoxyalkylene alkyl ether, polyoxyalkylene ester, polyoxyalkylene alkyl amine, polyoxyalkylene alkylamide, aliphatic alcohol polyoxyethylene adducts, aromatic alcohol polyoxyethylene adducts, polyvalent alcohol polyoxyethylene adducts, and the like.

Examples of the weak cationic surfactants include polyoxyalkylene adducts of a variety of amines. Examples of the polyoxyalkylene adducts of a variety of amines include terminal diamine polyethylene glycol, terminal diamine polyethylene glycol-polypropylene glycol copolymers, aliphatic amine polyoxyethylene adducts, aromatic amine polyoxyethylene adducts, polyvalent amine polyoxyethylene adducts, and the like.

One water-soluble base agent may be used singly or two or more water-soluble base agents may be mixed and used.

The water-soluble base agent is preferably, for example, one or more selected from the group consisting of a nonionic surfactant and a weak cationic surfactant.

The nonionic surfactant is preferably one or more selected from the group consisting of a polyethylene glycol and an ethylene oxide/resorcin copolymer.

The weak cationic surfactant is preferably a terminal diamine polyethylene glycol-polypropylene glycol copolymer.

The water-soluble base agent is preferably one or more selected from the group consisting of a polyethylene glycol, an ethylene oxide/resorcin copolymer, and a terminal diamine polyethylene glycol-polypropylene glycol copolymer.

The total content of the water-soluble base agent is preferably 20% by mass or more and 80% by mass or less and more preferably 30% by mass or more and 65% by mass or less with respect to the total amount of the entire flux.

The ratio (mass ratio) of the total content of the nonionic surfactants to the total content of the weak cationic surfactants is preferably 1.5 or more and 5 or less and more preferably 2 or more and 3.5 or less.

In a case where the nonionic surfactant is a polyethylene glycol, the molecular weight of the polyethylene glycol is preferably 1000 to 6000. The polyethylene glycol having a molecular weight within the above-described range is solid and thus easy to handle.

The molecular weight of the polyethylene glycol is more preferably 2000 to 4000. The polyethylene glycol having a molecular weight within the above-described range is highly water-soluble, which makes it easy to remove the residue of a flux containing this polyethylene glycol by water washing.

(Solvent)

Examples of the solvent that is used in the present embodiment include an alcohol-based solvent, a glycol ether-based solvent, terpineols, and the like.

The flux of the present embodiment does not contain water.

Examples of the alcohol-based solvent include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis (methylene) bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanole, 1,4-cyclohexanediol, 1,4-cyclohexanedimethanol, erythritol, threitol, guaiacol glycerol ether, 3,6-dimethyl-4-octyne-3,6-diol, 2,4,7,9-tetramethyl-5-decyne-4,7-diol, and the like.

Examples of the glycol ether-based solvent include aliphatic glycol ether-based solvents such as hexyl glycol, hexyl diglycol, 2-ethyl hexyl glycol, 2-ethyl hexyl diglycol, dimethyl triglycol, dibutyl diglycol, 2-methylpentane-2,4-diol, triethylene glycol monobutyl ether, tetraethylene glycol monomethyl ether, and tetraethylene glycol dimethyl ether;

aromatic glycol ether-based solvents such as phenyl glycol, phenyl diglycol, benzyl glycol, and benzyl diglycol; and the like.

One solvent or two or more solvents can be used.

The flux of the present embodiment may contain, for example, an activator, a resin, a thixotropic agent, or the like as other components.

(Activator)

Examples of the activator include an amine, a halogen compound, and an antioxidant.

Examples of the amine include azole-based compounds, other amines (excluding the azole-based compounds), and the like.

Examples of the azole-based compounds include imidazole, 2,4-diamino-6-methacryloyloxyethyl-s-triazine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 1,2,3-benzotriazole, 1-[N,N-bis(2-ethylhexyl)aminomethyl] benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl) benzotriazole, 1-[(2-ethylhexylamino)methyl]benzotriazole, 2,6-bis[(1H-benzotriazol-1-yl)methyl]-4-methylphenol, 5-methylbenzotriazole, 5-phenyltetrazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 1-dodecyl-2-methyl-3-benzylimidazolium chloride, 2-methylimidazoline, 2-phenylimidazoline, 6-(2-benzotriazolyl)-4-tert-octyl-6'-tert-butyl-4'-methyl-2,2'-methylenebisphenol, and the like.

Examples of the other amines include monoethanolamine, diethanolamine, ethylamine, triethylamine, cyclohexylamine, ethylenediamine, triethylenetetramine, 2,4-diamino-6-vinyl-s-triazine, 2,4-diamino-6-vinyl-s-triazine isocyanuric acid adducts, and the like.

One amine may be used singly or two or more amines may be mixed and used.

The amine is preferably one or more selected from the group consisting of imidazole and diethanolamine.

In a case where the flux of the present embodiment contains the amine, the content of the amine is preferably more than 0% by mass and 15% by mass or less and more preferably more than 0% by mass and 10% by mass or less with respect to the total amount of the entire flux.

Examples of the halogen compound include an organic halogen compound and an amine hydrohalide.

The amine hydrohalide is a compound obtained by reacting an amine and a hydrogen halide. Examples of the amine in the amine hydrohalide include ethylamine, ethylenediamine, triethylamine, diphenylguanidine, ditolylguanidine, methylimidazole, 2-ethyl-4-methylimidazole, and the like, and examples of the hydrogen halide include hydrides of chlorine, bromine, and iodine.

Examples of the organic halogen compound include trans-2,3-dibromo-2-butene-1,4-diol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, and the like.

One halogen compound may be used singly or two or more halogen compounds may be mixed and used.

Examples of the antioxidant include a hindered phenolic antioxidant and the like.

(Resin)

Examples of the resin include a rosin and the like.

Examples of the rosin that is used in the present embodiment include natural rosins, derivatives obtained from the natural rosins, and the like. Examples of the natural rosins include gum rosin, wood rosin, tall oil rosin, and the like. Examples of the derivatives include purified rosins, modified rosins, and the like. Examples of the modified rosins include hydrogenated rosins, polymerized rosins, disproportionated rosins, acid-modified rosins, rosin esters, phenol-modified rosins, α,β-unsaturated carboxylic acid-modified substances (acrylated rosins, maleated rosins, fumarated rosins, acrylic acid-modified hydrogenated rosins, and the like), the purified substances, hydrides, and disproportionated substances of the polymerized rosin, the purified substances, hydrides, and disproportionated substances of the α,β-unsaturated carboxylic acid-modified substance, and the like, and one or two or more thereof can be used.

The flux of the present embodiment contains the rosin, which makes it possible to suppress the deactivation and decomposition of the activator that is contained in the flux during reflow.

One rosin may be used singly or two or more rosins may be mixed and used.

The rosin is preferably a hydrogenated rosin.

In a case where the flux of the present embodiment contains the rosins, the total content of the rosins is preferably more than 0% by mass and 10% by mass or less and more preferably more than 0% by mass and less than 5% by mass with respect to the total amount of the entire flux.

(Thixotropic Agent)

Examples of the thixotropic agent include an amide compound, an ester compound, a sorbitol-based compound, and the like.

Examples of the amide compound include polyamides, bisamides, monoamides, and the like.

Specific examples thereof include monoamides such as lauric acid amide, palmitic acid amide, stearic acid amide, behenic acid amide, hydroxystearic acid amide, saturated fatty acid amides, oleic acid amide, erucic acid amide, unsaturated fatty acid amides, p-toluamide, p-toluenemethane amide, aromatic amides, hexamethylene hydroxystearic acid amide, substituted amides, methylol stearic acid amide, methylol amide, and fatty acid ester amides; bisamides such as methylene bis(stearic acid amide), ethylene bis(lauric acid amide), ethylene bis(hydroxy fatty acid (the number of carbon atoms in the fatty acid: C6 to 24) amide), ethylene bis(hydroxystearic acid amide), saturated fatty acid bis-amide, methylene bis(oleic acid amide), unsaturated fatty acid bisamide, m-xylylene bis(stearic acid amide), and aromatic bisamide; and polyamides such as saturated fatty acid polyamides, unsaturated fatty acid polyamides, aromatic polyamides, tris 1,2,3-propanetricarboxylate (2-methylcyclohexylamide), cyclic amide oligomers, and acyclic amide oligomers.

Examples of the cyclic amide oligomers include an amide oligomer in which a dicarboxylic acid and a diamine are polycondensed in a cyclic shape, an amide oligomer in which a tricarboxylic acid and a diamine are polycondensed in a cyclic shape, an amide oligomer in which a dicarboxylic acid and a triamine are polycondensed in a cyclic shape, an amide oligomer in which a tricarboxylic acid and a triamine are polycondensed in a cyclic shape, an amide oligomer in which a dicarboxylic acid, a tricarboxylic acid, and a diamine are polycondensed in a cyclic shape, an amide oligomer in which a dicarboxylic acid, a tricarboxylic acid, and a triamine are polycondensed in a cyclic shape, an amide oligomer in which a dicarboxylic acid, a diamine, and a triamine are polycondensed in a cyclic shape, an amide oligomer in which a tricarboxylic acid, a diamine, and a triamine are polycondensed in a cyclic shape, an amide oligomer in which a dicarboxylic acid, a tricarboxylic acid, a diamine, and a triamine are polycondensed in a cyclic shape, and the like.

In addition, examples of the acyclic amide oligomer include an amide oligomer in which a monocarboxylic acid and a diamine and/or a triamine are polycondensed in an acyclic shape, an amide oligomer in which a dicarboxylic acid and/or a tricarboxylic acid and a monoamine are polycondensed in an acyclic shape, and the like. When the acyclic amide oligomer is an amide oligomer containing a monocarboxylic acid or a monoamine, the monocarboxylic acid or the monoamine functions as a terminal molecule, and the acyclic amide oligomer has a reduced molecular weight. In addition, in a case where the acyclic amide oligomer is an amide compound in which a dicarboxylic acid and/or a tricarboxylic acid and a diamine and/or a triamine are polycondensed in an acyclic shape, the acyclic amide oligomer becomes an acyclic polymer-based amide polymer. Furthermore, examples of the acyclic amide oligomer also include an amide oligomer in which a monocarboxylic acid and a monoamine are condensed in an acyclic shape.

Examples of the ester compound, which is the thixotropic agent, include hydrogenated castor oil and the like.

Examples of the sorbitol-based compound, which is the thixotropic agent, include dibenzylidene sorbitol, bis(4-methylbenzylidene) sorbitol, (D-)sorbitol, monobenzylidene (-D-)sorbitol, mono(4-methylbenzylidene)-(D-)sorbitol, and the like.

As the thixotropic agent, it is also possible to use a polyethylene glycol. For example, a polyethylene glycol having a molecular weight of 4000 (PEG4000) is capable of imparting thixotropic properties to the solder paste.

One thixotropic agent or two or more thixotropic agents can be used.

A flux of the present embodiment contains an organic acid, a water-soluble base agent, and a solvent, but does not contain water. The organic acid includes 1,2,3-propanetricarboxylic acid. When the content of the 1,2,3-propanetricarboxylic acid is more than 0% by mass and 15% by mass or less with respect to the total amount of the entire flux, it is possible to make the flux have sufficient solder wettability and a sufficient ball missing suppression capability.

Alternatively, the flux of the present embodiment contains an organic acid, a water-soluble base agent, and a solvent, but does not contain water, and the organic acid includes 1,2,3-propanetricarboxylic acid, and the water-soluble base agent is one or more selected from the group consisting of a nonionic surfactant and a weak cationic surfactant.

The nonionic surfactant is one or more selected from the group consisting of a polyethylene glycol, an ethylene oxide-resorcin copolymer, polyoxyalkylene acetylene glycols, polyoxyalkylene glyceryl ether, polyoxyalkylene alkyl ether, polyoxyalkylene ester, polyoxyalkylene alkyl amine, polyoxyalkylene alkylamide, an aliphatic alcohol polyoxyethylene adduct, an aromatic alcohol polyoxyethylene adduct, and a polyvalent alcohol polyoxyethylene adduct.

The weak cationic surfactant is one or more selected from the group consisting of terminal diamine polyethylene glycol, a terminal diamine polyethylene glycol-polypropylene glycol copolymer, an aliphatic amine polyoxyethylene adduct, an aromatic amine polyoxyethylene adduct, and a polyvalent amine polyoxyethylene adduct.

In addition, the content of the 1,2,3-propanetricarboxylic acid is 1% by mass or more and 15% by mass or less with respect to the total amount of the entire flux, the total content of the water-soluble base agent is 30% by mass or more and 65% by mass or less with respect to the total amount of the entire flux, and the total content of the solvent is 30% by mass or more and 65% by mass or less with respect to the total amount of the entire flux.

According to the flux of such an embodiment, it is possible to enhance the wettability of solder and to suppress ball missing after reflow and flux residue washing.

Example of Solder Paste of Present Embodiment

A solder paste of the present embodiment contains the above-described flux and a solder powder.

The solder powder is made of a powder of pure Sn solder, a Sn—Ag-based alloy, a Sn—Cu-based alloy, a Sn—Ag—Cu-based alloy, a Sn—Bi-based alloy, a Sn—In-based alloy, or a powder of a solder alloy obtained by adding Sb, Bi, In, Cu, Zn, As, Ag, Cd, Fe, Ni, Co, Au, Ge, P, or the like to the above-described alloy.

Content of Flux:

The content of the flux is preferably 5 to 95% by mass and more preferably 5 to 15% by mass with respect to the total mass of the solder paste.

When the content of the flux in the solder paste is within this range, a thickening suppression effect attributed to the solder powder is sufficiently exhibited. Additionally, favorable wetting and spreading are exhibited even under conditions with a large heat load, and the wetting speed improves.

The solder paste containing the above-described flux and the solder powder is excellent in terms of solder wettability and the ball missing suppression capability.

EXAMPLES

Hereinafter, the present invention will be described with examples, but the present invention is not limited to the following examples.

Fluxes of examples and comparative examples were prepared according to compositions shown in Table 1, Table 2, and Table 3 below, solder pastes were prepared using these fluxes, and the solder wettability (wetting speed) and the ball missing suppression capabilities of the fluxes were verified.

Composition fractions in Table 1, Table 2, and Table 3 are "% by mass" in a case where the total amount of the flux is set to 100, and vacant cells means "0% by mass".

The solder paste included 11% by mass of the flux and 89% by mass of a metal powder. In addition, the metal powder in the solder paste was a Sn—Ag—Cu-based solder alloy containing 3.0% by mass of Ag, 0.5% by mass of Cu, and a balance consisting of Sn. In addition, the size of a metal powder in the solder paste is a size (particle size distribution) that satisfies the symbol 5 in the powder size classification (Table 2) in JIS Z 3284-1: 2004.

<Evaluation of Solder Wettability (Wetting Speed)>

(1) Verification Method

The wetting speed of the solder paste was evaluated as described below based on the method of the meniscograph test by performing an oxidation treatment on a copper plate having a width of 5 mm, a length of 25 mm, and a thickness of 0.5 mm at 150° C. for 1 hour to obtain a copper oxide plate as a test plate using Solder Checker SAT-5200 (manufactured by RHESCA Co., Ltd.) as a testing device and Sn-3Ag-0.5Cu (each numerical value is "mass %") as solder.

First, the test plate was immersed 5 mm in each of the fluxes of Examples 1 to 17 and Comparative Examples 1 to 4 weighed out into a beaker to apply the flux to the test plate. Subsequently, after the application of the flux, the test plate to which the flux had been applied was rapidly immersed in a solder bath to obtain zero cross time (sec). Subsequently, measurement was performed five times on each of the fluxes of Examples 1 to 17 and Comparative Examples 1 to 4, and the average value of the obtained 5 zero cross times (sec) was calculated. The test conditions were set as described below.

Immersion speed into solder bath: 5 mm/sec (JIS Z 3198-4: 2003)

Immersion depth into solder bath: 2 mm (JIS Z 3198-4: 2003)

Immersion time in solder bath: 10 sec (JIS Z 3198-4: 2003)

Solder bath temperature: 245° C. (JIS C 60068-2-69: 2019)

As the average value of the zero cross times (sec) become shorter, the wetting speed becomes faster, which means that the solder wettability is favorable.

(2) Determination Standards

O: The average value of zero cross times (sec) is 6 seconds or shorter.

X: The average value of zero cross times (sec) exceeds 6 seconds.

<Evaluation of Ball Missing Suppression Capability>

(1) Verification Method

A mask having a predetermined opening was disposed on an electrode having an opening diameter of φ0.24 mm on a printed circuit board of a Cu-OSP electrode, the flux was applied, and the mask was removed. Subsequently, a solder ball having a composition of Sn-3Ag-0.5Cu (each numerical value is "% by mass") and having a sphere diameter of φ0.3 mm was mounted (placed) on the coated surface, and then reflow was performed in a nitrogen atmosphere. As the reflow conditions, the temperature was raised from room temperature to 250° C. at a temperature rising rate of 2° C./s and then held at 250° C. for 30 seconds. Subsequently, the reflowed board was immersed and washed in water for 1 minute and dried. Subsequently, whether or not ball missing occurred was observed with an optical microscope. Such an operation was performed on 30 electrodes.

(2) Determination Standards

O: Ball missing was not observed in any of the electrodes.

X: There was one or more electrodes in which ball missing was observed.

<Comprehensive Evaluation>

O: All of the solder wettability and ball missing suppression capability of the solder paste are O.

X: At least one of the solder wettability and ball missing suppression capability of the solder paste is X.

TABLE 1

| | Material | | Example 1 | Example 2 | Example 3 | Example 4 | Example 5 | Example 6 | Example 7 | Example 8 | Example 9 |
|---|---|---|---|---|---|---|---|---|---|---|---|
| Organic acids | Specific organic acid | 1,2,3-Propane-tricarboxylic acid | 1 | 3 | 3 | 3 | 5 | 7 | 10 | 15 | 1 |
| | Other organic acid | Adipic acid | | | | | | | | | |
| | | 2,2-Bis(hydroxy-methyl)propionic acid | | | | | | | | | 5 |
| | | Succinic acid | | | | | | | | | 5 |
| Amines | Azole-based compound | Imidazole | | | | | | | | | |
| | Other amine | Diethanolamine | | | | | | | | | |
| Water-soluble base agents | Nonionic surfactant | Polyethylene glycol 4000 | 20 | 20 | 20 | 20 | 20 | 20 | 20 | 20 | 20 |
| | | Ethylene oxide/resorcin copolymer | 15 | 15 | 15 | 15 | 15 | 15 | 15 | 15 | 15 |
| | Weak cationic surfactant | Terminal diamine PEG-PPG copolymer | 10 | 10 | 10 | 10 | 10 | 10 | 10 | 10 | 10 |
| Resin | Rosin | Hydrogenated rosin | | | | | | | | | |
| Solvents | Water | Water | | | | | | | | | |
| | Glycol-based solvent | Hexyl diglycol | 54 | 52 | | 26 | 50 | 48 | 45 | 40 | 44 |
| | | Phenyl glycol | | | 52 | 26 | | | | | |
| | Total content | | 100 | 100 | 100 | 100 | 100 | 100 | 100 | 100 | 100 |
| | Solder wettability (wetting speed) | | O | O | O | O | O | O | O | O | O |

TABLE 1-continued

| Material | Example 1 | Example 2 | Example 3 | Example 4 | Example 5 | Example 6 | Example 7 | Example 8 | Example 9 |
|---|---|---|---|---|---|---|---|---|---|
| Ball missing suppression capability | O | O | O | O | O | O | O | O | O |
| Comprehensive evaluation | O | O | O | O | O | O | O | O | O |

TABLE 2

| | | Material | Example 10 | Example 11 | Example 12 | Example 13 | Example 14 | Example 15 | Example 16 | Example 17 |
|---|---|---|---|---|---|---|---|---|---|---|
| Organic acids | Specific organic acid | 1,2,3-Propane-tricarboxylic acid | 3 | 3 | 5 | 5 | 10 | 3 | 5 | 5 |
| | Other organic acid | Adipic acid | | | | | | | | |
| | | 2,2-Bis(hydroxymethyl)propionic acid | | | | | | | | |
| | | Succinic acid | | | | 3 | 3 | | | |
| Amines | Azole-based compound | Imidazole | 2 | 10 | | 2 | 2 | | | |
| | Other amine | Diethanolamine | | | 2 | | | | | |
| Water-soluble base agents | Nonionic surfactant | Polyethylene glycol 4000 | 20 | 20 | 20 | 30 | 30 | 20 | 20 | 20 |
| | | Ethylene oxide/resorcin copolymer | 15 | 15 | 15 | 15 | 15 | 15 | | 15 |
| | Weak cationic surfactant | Terminal diamine PEG-PPG copolymer | 10 | 10 | 10 | | | 10 | 10 | 30 |
| Resin | Rosin | Hydrogenated rosin | | | | | | 4.5 | | |
| Solvents | Water | Water | | | | | | | | |
| | Glycol-based solvent | Hexyl diglycol | 50 | 42 | 48 | 45 | 40 | 47.5 | 65 | 30 |
| | | Phenyl glycol | | | | | | | | |
| Total content | | | 100 | 100 | 100 | 100 | 100 | 100 | 100 | 100 |
| Solder wettability (wetting speed) | | | O | O | O | O | O | O | O | O |
| Ball missing suppression capability | | | O | O | O | O | O | O | O | O |
| Comprehensive evaluation | | | O | O | O | O | O | O | O | O |

TABLE 3

| | | Material | Comparative Example 1 | Comparative Example 2 | Comparative Example 3 | Comparative Example 4 |
|---|---|---|---|---|---|---|
| Organic acids | Specific organic acid | 1,2,3-Propane-tricarboxylic acid | | | 3 | 5 |
| | Other organic acid | Adipic acid | | 3 | | |
| | | 2,2-Bis(hydroxymethyl)propionic acid | | | | |
| | | Succinic acid | | | | |
| Amines | Azole-based compound | Imidazole | | | | |
| | Other amine | Diethanolamine | | | | |
| Water-soluble base agents | Nonionic surfactant | Polyethylene glycol 4000 | 20 | 20 | 20 | |
| | | Ethylene oxide/resorcin copolymer | 15 | 15 | 15 | |
| | Weak cationic surfactant | Terminal diamine PEG-PPG copolymer | 10 | 10 | 10 | |

TABLE 3-continued

| Material | | | Comparative Example 1 | Comparative Example 2 | Comparative Example 3 | Comparative Example 4 |
|---|---|---|---|---|---|---|
| Resin | Rosin | Hydrogenated rosin | | | | |
| Solvents | Water | Water | | | 10 | |
| | Glycol-based solvent | Hexyl diglycol Phenyl glycol | 55 | 52 | 42 | 95 |
| | Total content | | 100 | 100 | 100 | 100 |
| | Solder wettability (wetting speed) | | X | X | O | O |
| | Ball missing suppression capability | | X | O | X | X |
| | Comprehensive evaluation | | X | X | X | X |

In the present invention, as shown in Example 1, when the flux contained 1,2,3-propanetricarboxylic acid as an organic acid within the range specified in the present invention, contained polyethylene glycol 4000 and an ethylene oxide/resorcin copolymer, which are nonionic surfactants, and a terminal diamine polyethylene glycol-polypropylene glycol copolymer (terminal diamine PEG-PPG copolymer), which is a weak cationic surfactant, as water-soluble base agents and a hexyl diglycol as a solvent, but the flux did not contain water, it was possible to make the flux have sufficient solder wettability and a sufficient ball missing suppression capability.

As shown in Example 2, even when the content of 1,2,3-propanetricarboxylic acid was changed within the range specified in the present invention, it was possible to make the flux have sufficient solder wettability and a sufficient ball missing suppression capability.

As shown in Examples 3 and 4, even when the content of 1,2,3-propanetricarboxylic acid was changed within the range specified in the present invention, the kind of the solvent was changed, and a plurality of kinds of solvents were contained, it was possible to make the fluxes have sufficient solder wettability and a sufficient ball missing suppression capability.

As shown in Examples 5 to 8, when 1,2,3-propanetricarboxylic acid was contained within the range specified in the present invention, it was possible to make the fluxes have sufficient solder wettability and a sufficient ball missing suppression capability.

As shown in Example 9, when 1,2,3-propanetricarboxylic acid was contained within the range specified in the present invention, and an organic acid other than the 1,2,3-propanetricarboxylic acid (other organic acid) was contained, it was possible to make the flux have sufficient solder wettability and a sufficient ball missing suppression capability.

As shown in Examples 10 and 11, when 1,2,3-propanetricarboxylic acid was contained within the range specified in the present invention, and furthermore, an azole-based compound was contained, it was possible to make the fluxes have sufficient solder wettability and a sufficient ball missing suppression capability.

As shown in Example 12, when 1,2,3-propanetricarboxylic acid was contained within the range specified in the present invention, and furthermore, another amine was contained, it was possible to make the flux have sufficient solder wettability and a sufficient ball missing suppression capability.

As shown in Examples 13 and 14, when 1,2,3-propanetricarboxylic acid was contained within the range specified in the present invention, furthermore, another organic acid was contained, and an azole-based compound was contained, it was possible to make the fluxes have sufficient solder wettability and a sufficient ball missing suppression capability.

As shown in Example 15, when 1,2,3-propanetricarboxylic acid was contained within the range specified in the present invention, and furthermore, a rosin was contained, it was possible to make the flux have sufficient solder wettability and a sufficient ball missing suppression capability.

As shown in Example 16, when 1,2,3-propanetricarboxylic acid was contained within the range specified in the present invention, and furthermore, the kind of the nonionic surfactant was changed, it was possible to make the flux have sufficient solder wettability and a sufficient ball missing suppression capability.

As shown in Example 17, when 1,2,3-propanetricarboxylic acid was contained within the range specified in the present invention, and furthermore, the content of the weak cationic surfactant was increased, it was possible to make the flux have sufficient solder wettability and a sufficient ball missing suppression capability.

Examples 1 to 17 contained 1,2,3-propanetricarboxylic acid within the range specified in the present invention and had sufficient solder wettability.

In contrast, Comparative Examples 1 and 2 did not contain 1,2,3-propanetricarboxylic acid and had insufficient solder wettability.

From these results, it was clarified that, when 1,2,3-propanetricarboxylic acid is contained within the range specified in the present invention, it is possible to make fluxes have sufficient solder wettability.

Examples 1 to 17 contained 1,2,3-propanetricarboxylic acid within the range specified in the present invention, furthermore, contained a water-soluble base agent, and had a sufficient ball missing suppression capability.

Comparative Example 1 did not contain 1,2,3-propanetricarboxylic acid and had an insufficient ball missing suppression capability.

Comparative Example 3 contained water and had an insufficient ball missing suppression capability.

Comparative Example 4 did not contain a water-soluble base agent and had an insufficient ball missing suppression capability.

From these results, it was clarified that, when a water-soluble base agent is contained, but water is not contained, it is possible to make fluxes have a sufficient ball missing suppression capability.

INDUSTRIAL APPLICABILITY

According to the present invention, it is possible to provide a flux with which the wettability of solder can be enhanced and ball missing after reflow and flux residue washing is suppressed.

What is claimed is:

1. A flux comprising:
an organic acid;
a water-soluble base agent; and
a solvent,
wherein the flux does not contain water,
the organic acid includes 1,2,3-propanetricarboxylic acid,
the water-soluble base agent is one or more selected from the group consisting of a nonionic surfactant and a weak cationic surfactant,
the nonionic surfactant is one or more selected from the group consisting of a polyethylene glycol having a molecular weight of 1000 to 6000, an ethylene oxide-resorcin copolymer, polyoxyalkylene alkyl amine, polyoxyalkylene alkylamide, and an aromatic alcohol polyoxyethylene adduct,
the weak cationic surfactant is one or more selected from the group consisting of terminal diamine polyethylene glycol, a terminal diamine polyethylene glycol-polypropylene glycol copolymer, an aliphatic amine polyoxyethylene adduct, an aromatic amine polyoxyethylene adduct, and a polyvalent amine polyoxyethylene adduct,
a content of the 1,2,3-propanetricarboxylic acid is 1% by mass or more and 15% by mass or less with respect to a total amount of the entire flux,
a total content of the water-soluble base agent is 30% by mass or more and 65% by mass or less with respect to the total amount of the entire flux, and
a total content of the solvent is 30% by mass or more and 65% by mass or less with respect to the total amount of an entire flux.

2. The flux according to claim 1, further comprising:
an organic acid other than the 1,2,3-propanetricarboxylic acid,
wherein a content of the organic acid other than the 1,2,3-propanetricarboxylic acid is more than 0% by mass and 10% by mass or less with respect to the total amount of the entire flux.

3. The flux according to claim 1, further comprising:
an amine,
wherein a content of the amine is more than 0% by mass and 10% by mass or less with respect to the total amount of the entire flux.

4. The flux according to claim 1, further comprising:
a rosin,
wherein a content of the rosin is more than 0% by mass and less than 5% by mass with respect to the total amount of the entire flux.

5. A solder paste comprising:
the flux according to claim 1; and
a solder powder.

* * * * *